US006012602A

United States Patent [19]

Yuyama et al.

[11] Patent Number: 6,012,602

[45] Date of Patent: Jan. 11, 2000

[54] DRUG STORAGE/DISCHARGE APPARATUS

[75] Inventors: Shoji Yuyama; Naoki Koike; Hirotaka Hayashi, all of Toyonaka, Japan

[73] Assignee: Kabushiki Kaisha Yuyama Seisakusho, Osaka, Japan

[21] Appl. No.: 09/263,203

[22] Filed: Mar. 5, 1999

Related U.S. Application Data

[62] Division of application No. 08/787,280, Jan. 24, 1997.

[30] Foreign Application Priority Data

Jan. 26, 1996 [JP] Japan .................................... 8-11589

[51] Int. Cl.[7] .................................................. B65G 59/00

[52] U.S. Cl. ......................... 221/130; 221/131; 221/132; 221/133

[58] Field of Search ............................ 221/92, 124, 130, 221/131, 132, 133, 120

[56] References Cited

U.S. PATENT DOCUMENTS

| | | | |
|---|---|---|---|
| 4,267,942 | 5/1981 | Wick, Jr. et al. | 221/92 X |
| 4,664,289 | 5/1987 | Shimizu et al. . | |
| 4,953,745 | 9/1990 | Rowlett, Jr. . | |
| 5,097,982 | 3/1992 | Kedem et al. . | |
| 5,348,061 | 9/1994 | Riley et al. | 221/133 X |
| 5,361,937 | 11/1994 | Wiese | 221/130 X |
| 5,611,456 | 3/1997 | Kasper | 221/131 X |
| 5,667,096 | 9/1997 | Wu | 221/130 X |
| 5,787,678 | 8/1998 | Koike et al. | 221/133 X |

FOREIGN PATENT DOCUMENTS

| | | | |
|---|---|---|---|
| 406020146 | 1/1994 | Japan | 221/130 |
| 406024401 | 2/1994 | Japan | 221/132 |
| 6-24401 | 2/1994 | Japan . | |
| 6-64601 | 3/1994 | Japan . | |
| 2 240 543 | 8/1991 | United Kingdom . | |
| 092014389 | 9/1992 | WIPO | 221/130 |

*Primary Examiner*—Robert P. Olszewski
*Assistant Examiner*—Steven B. McAllister
*Attorney, Agent, or Firm*—Wenderoth, Lind & Ponack, L.L.P.

[57] ABSTRACT

A drug storage/discharge apparatus which makes it possible to easily clean its drug discharge paths and to visually check if the guide paths have been cleaned sufficiently, and which does not require high dimensional and assembling accuracy for component parts. Each cabinet supports a plurality of vertically arranged rows of feeders on both sides thereof. A plurality of feeders forming each row are coupled together, and each feeder row thus coupled together has one end thereof pivotally coupled to the cabinet so as to be pivotable into its open position. When in the closed position, the feeder rows form one side wall of each drug guide path. The drug guide paths are exposed by drawing out the cabinet and opening the feeder rows on one side of the cabinet.

2 Claims, 8 Drawing Sheets

DRUG STORAGE/DISCHARGE APPARATUS

This a Divisional Application of Ser. No. 08/787,280, filed Jan. 24, 1997.

BACKGROUND OF THE INVENTION

This invention relates to a drug storage/discharge apparatus for storing drugs in feeders and discharging the drugs stored in the feeders in a controlled manner.

FIG. 8 shows a conventional apparatus of this type. The apparatus comprises a rotatably supported inner annular plate 81 and outer annular plate 82, and feeder columns 83 mounted on the respective annular plates 81 and 82 and arranged in two concentric circles. A drug guide path 84 extends vertically along each feeder column 83. A hopper 85 is provided under the annular plates 81 and 82. A drug packer (not shown) Is provided under the hopper 85.

Each feeder column 83 comprises a plurality of feeders 86 vertically stacked one on another. Each feeder 86 stores a large number of drugs (tablets or capsules) and can discharge them one by one into the respective drug guide path 84.

The hopper 85 collects the drugs discharged from the feeders and guides them into the drug packer, which puts the drugs in pouches and seals the pouches.

While drugs are dropping through the drug guide paths 84, they may be abraded or chipped by touching the side walls of the guide paths, and their broken pieces or powder may stick to the side walls, of the drug guide paths thus polluting the side walls. This is not hygienically desirable.

Also, drugs dropping through the guide paths 84 may scrape off any dust and dirt stuck on the side walls of the guide paths. The dust and dirt scraped off will drop into the hopper 85 and eventually find their way into drug pouches. Such dust and dirt mixed into drug pouches not only are a discomfort to patients, but are potentially dangerous if such dust and dirt are broken pieces of drugs that must not be prescribed to a particular patient. Thus, it is essential to periodically clean the drug guide paths 84.

Heretofore, a long brush was used to clean the drug guide paths. That is, pollutants stuck on the side walls of the guide paths 84 were removed by inserting a long brush into each guide path 84 from below and moving it up and down. In order to insert a brush into each guide path from below, the hopper 85 and the packer have to be dismounted. Thus, such cleaning work was extremely troublesome. Another problem is that it is impossible to see the inside of the guide paths and thus to visually check whether or not the guide paths have been cleaned sufficiently.

Examined Japanese Utility Model Publication 6-3603 proposes a "tablet storage/discharge device" having tablet guide paths which can be cleaned easily. The tablet guide paths of this device are defined between rows of drawers. Each drawer comprises a plurality of feeders. Tablets discharged from the respective feeders drop in the guide paths. By drawing out the drawers, the tablet guide paths are exposed, so that the guide paths can be cleaned easily. Also, it is possible to visually check if the guide paths have been cleaned sufficiently.

In this arrangement, in order to prevent tablets of the smallest diameter from dropping out, the drawers have to be assembled so that the gap between the adjacent drawers will be smaller than the smallest-diameter tablets. For this purpose, the drawers and the drawer-supporting frame have to be constructed and assembled with extremely high accuracy. Moreover, even if the gap is sufficiently small initially, it may increase gradually with use.

An object of this invention is to provide a drug storage/discharge apparatus which makes it possible to easily clean the drug discharge paths and to visually check if the guide paths have been cleaned sufficiently, and which does not require very high dimensional and assembling accuracy for their component parts.

SUMMARY OF THE INVENTION

According to this invention, there is provided a drug storage/discharge apparatus comprising a plurality of feeders arranged in a row and each feeders keeping a plurality of drugs, and a drug guide path extending along the feeders through which drugs stored in the respective feeders are discharged. At least one side wall of the drug guide path is openable.

With this arrangement, by opening one side wall of each drug guide path, it is possible to easily clean the guide paths and to visually check if the guide paths have been cleaned sufficiently.

Such an openable side wall of each guide path may be formed by side walls of a plurality of feeders arranged in a row. Also, such a row of feeders may be coupled together to form a feeder row assembly, and such a feeder row assembly may have its one end pivotally coupled so that the assembly is pivotable into an open position.

Other features and objects of the present invention will become apparent from the following description made with reference to the accompanying drawings, in which:

DETAILED DESCRIPTION OF THE PREFERRED ENBODIMENET

Embodiments of this invention will now be described with reference to the accompanying drawings.

Figure 1:
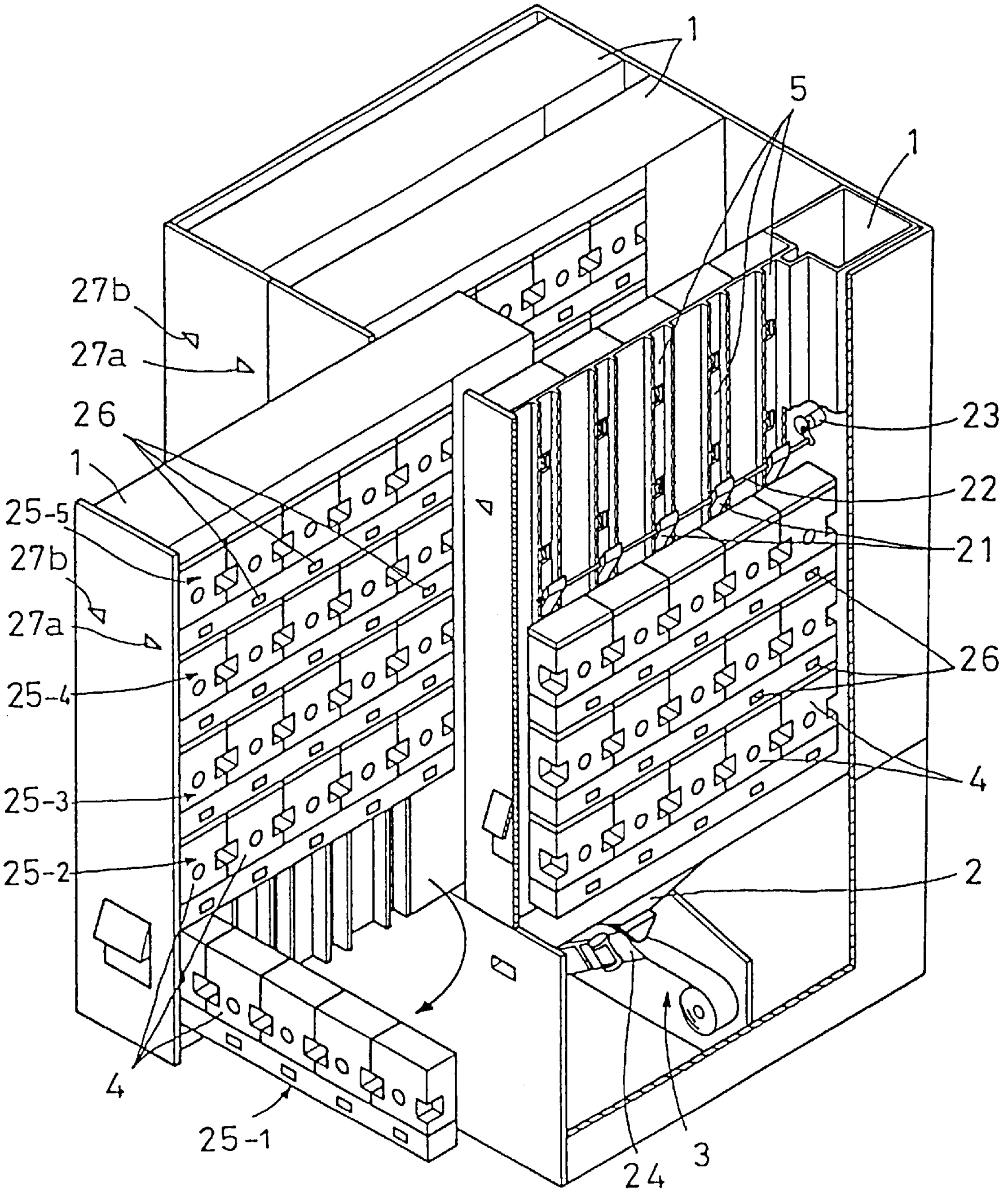
FIG. 1 is a perspective view of one embodiment of a drug storage/discharge apparatus according to this invention.

FIG. 1 shows an embodiment of a drug storage/discharge apparatus according to this invention. It comprises a plurality of drawer type feeder cabinets 1, a hopper 2 and a packing unit 3 provided under the cabinets 1.

The cabinets 1 are supported on rails or rollers so as to be horizontally movable independently of one another. Each cabinet 1 supports a plurality of vertically arranged rows of feeders 4. A drug guide path 5 extends vertically between each feeder column pair opposite to each other on both sides of each cabinet.

Figure 2:
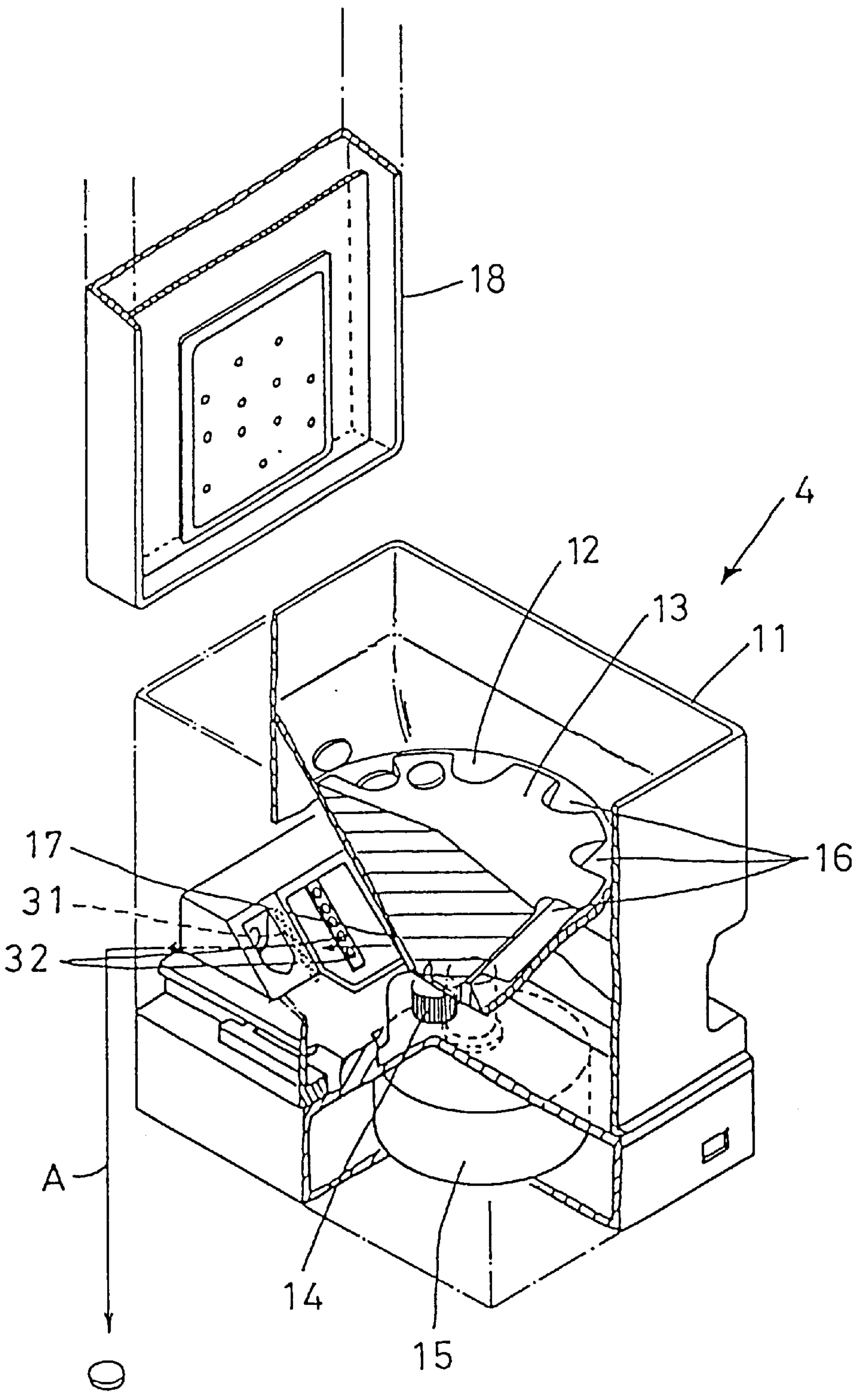
FIG. 2 is a perspective view of a feeder of the apparatus of FIG. 1.

FIG. 2 shows the detailed structure of a feeder 4. It comprises an outer case 11, an inner case 12 set in the outer case 11 and having a conical recess, a conical member 13 rotatably received in the inner case 12 and having a gear 14 fixed to its bottom, and an intermittent motor 15 having an output shaft carrying a gear in mesh with the gear 14 to intermittently rotate the conical member 13. A plurality of grooves 16 are formed in the outer periphery of the conical member 13. A drug discharge opening 17 is formed in the bottom of the inner case 12.

With a plurality of drugs stored in the outer case 11 and the case 11 closed by a cover 18, the conical member 13 is intermittently rotated to guide the drugs one by one into each groove 16. By further intermittent rotation of the conical member 13, the drugs in the grooves 16, which are under the influence of centrifugal force, will be discharged one by one through the discharge opening 17 of the inner case 12 every time each groove 16 aligns with the opening 17.

Each drug discharged falls down a discharge path shown by arrow A into the drug guide path 5 and drops through the guide path 5 into the hopper 2.

As shown in FIG. 1, shutter plates 21 are provided in the respective drug guide paths 5. They are supported on and coupled together by a horizontal shaft 22 extending through a substantially central portion of each cabinet 1. The shaft 22 is connected to the output shaft of a motor 23, which can rotate the shaft by 180 ° at a time to open and close the shutter plates 21. The shutter plates 21 are used to temporarily store drugs discharged from feeders located above the shutters and drop them at controlled intervals.

One or a plurality of drugs discharged from any feeder 4 drop through the respective guide path 5 into the hopper 2. They are then collected into a mass on the hopper 2 and dropped into a pouch 24. The pouch is then closed with at least one drug sealed therein.

Each cabinet 1 supports a plurality of vertically stacked, horizontal rows of feeders 4 on both sides thereof. Each cabinetside consists of five feeder rows 25-1-25-5 The feeders 4 in each row are coupled together and each row is pivotally coupled at one end thereof to the cabinet 1 so as to be movable between an open position and a closed position. When in the closed position, one side of each feeder row 25-1-25-5 defines part of sides walls of the drug guide paths 5. By drawing out one cabinet 1 and opening the feeder rows 25-1-25-5 on one side of this cabinet 1, the guide paths 5 of this cabinet 1 can be accessed from this side.

Each feeder 4 is provided with a second warning lamp 26 adapted to be turned on when the corresponding drug guide path 5 has been soiled to a certain degree. Each cabinet 1 has first warning lamps **27*a* and 27*b* on both sides which are also adapted to be turned on when the drug guide paths 5** have been soiled to a certain degree.

Figure 3:
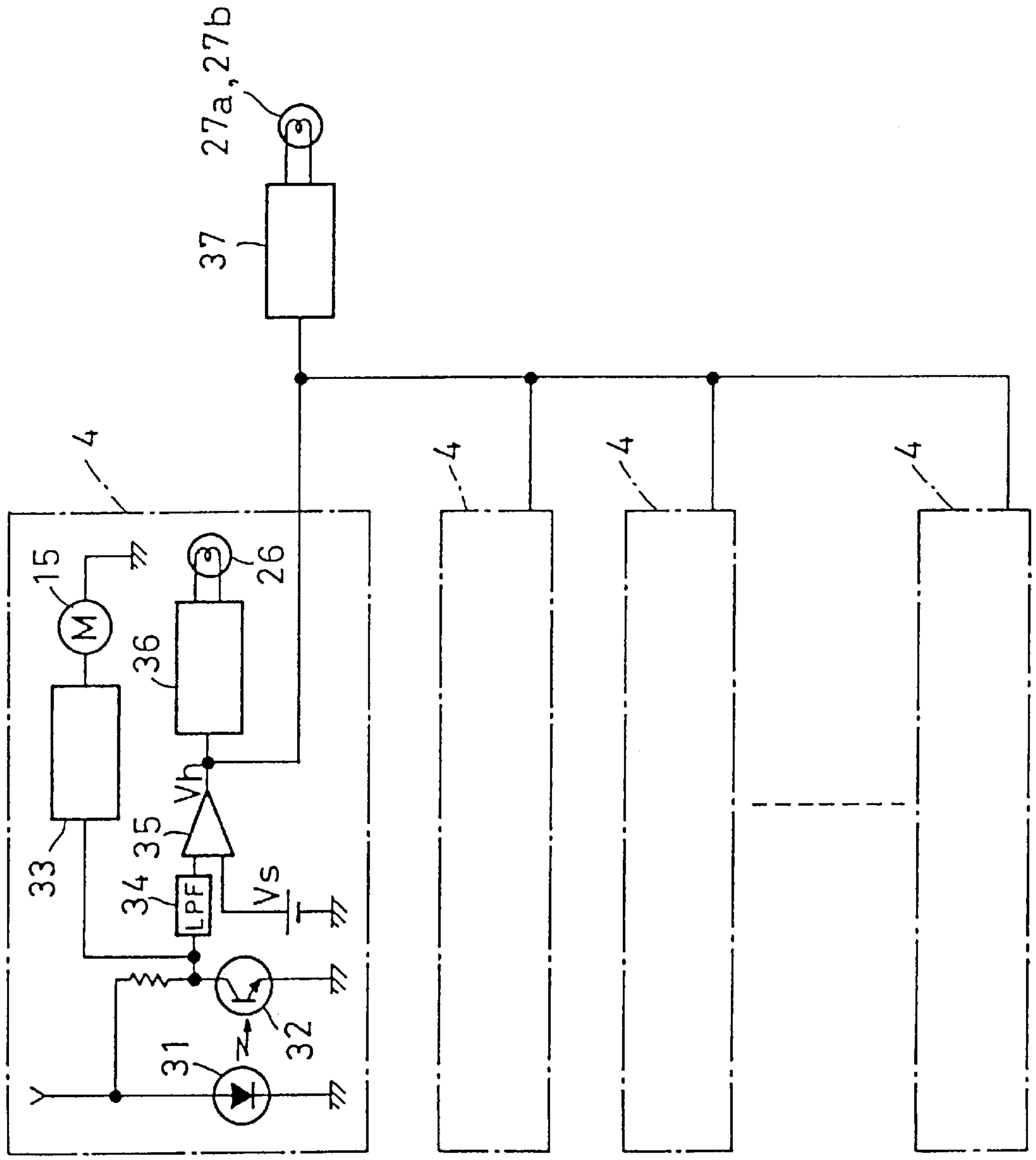
FIG. 3 is a schematic view of a circuit of each feeder of the apparatus of FIG. 1.

FIG. 3 schematically shows circuits for the respective feeders 4 on one side of each cabinet 1. A light emitting diode 31 and a phototransistor 32 are provided opposite to each other in the discharge path of each feeder 4. In a normal state, the phototransistor 32 is kept on by receiving light from the light emitting diode 31.

A motor control circuit 33 intermittently rotates the intermittent motor 15 of each feeder 4 in response to a command from a microprocessor (not shown) as a comprehensive control means of the entire apparatus. When the motor 15 is activated, one drug is discharged through the opening 17 of the inner case 12. The drug intercepts the light from the light emitting diode 31, so that the output of the phototransistor 32 changes. If only one drug is to be discharged, the motor 15 is deactivated as soon as the output of the phototransistor 32 changes once. If a predetermined number (not one) of drugs are to be discharged, the motor 15 is kept activated until the number of changes in the output of the phototransistor 32 reaches the predetermined number, and then deactivated to discharge the predetermined number of drugs.

A low-pass filter 34 applies only low-frequency components of the output of phototransistor 32 to a comparator 35. Such low-frequency components contain no sharp fluctuations in the output of the phototransistor 32 resulting from the interception of light by discharged drugs but only gradual output fluctuations. That is, the level of such low-frequency components tends to drop gradually as the light emitting surface and the light intercepting surface are soiled gradually by drugs discharged from the feeder.

The comparator 35 compares the level of the low-frequency components from the phototransistor 32 with a threshold voltage Vs, and outputs a high-level voltage Vh if the former drops below the latter.

Such a high-level voltage Vh indicates that the light emitting surface of the light emitting diode 31 and the light intercepting surface of the phototransistor 32 are soiled to a predetermined degree. In such a case, it is highly probable that the drug guide path 5 corresponding to the particular feeder 4 is also soiled to the same degree.

The high-level voltage Vh produced by the comparator 35 is applied to lighting circuits 36 and 37. In response, the lighting circuit 36 turns on the second warning lamp 26 of the particular feeder 4, while the lighting circuit 37 turns on the first warning lamp **27*a* (or 27*b*) of the cabinet 1. If the first warning lamp 27*a* (or 27*b*) of a cabinet 1 is turned on, this cabinet is drawn out to find out the feeder 4 whose second warning lamp 26 is on, and the discharge opening 17 of this feeder 4 and its light emitting diode 31 and phototransistor 32** are cleaned.

Then, the feeder rows 25-1-25-2 on one side of the cabinet 1 are opened to expose the drug guide paths 5, and the guide path 5, corresponding to the feeder 4 whose second warning lamp 26 is on, is cleaned. Since the guide path 5 is exposed, it is possible to visually check if the guide path has been sufficently cleaned.

Figure 4:
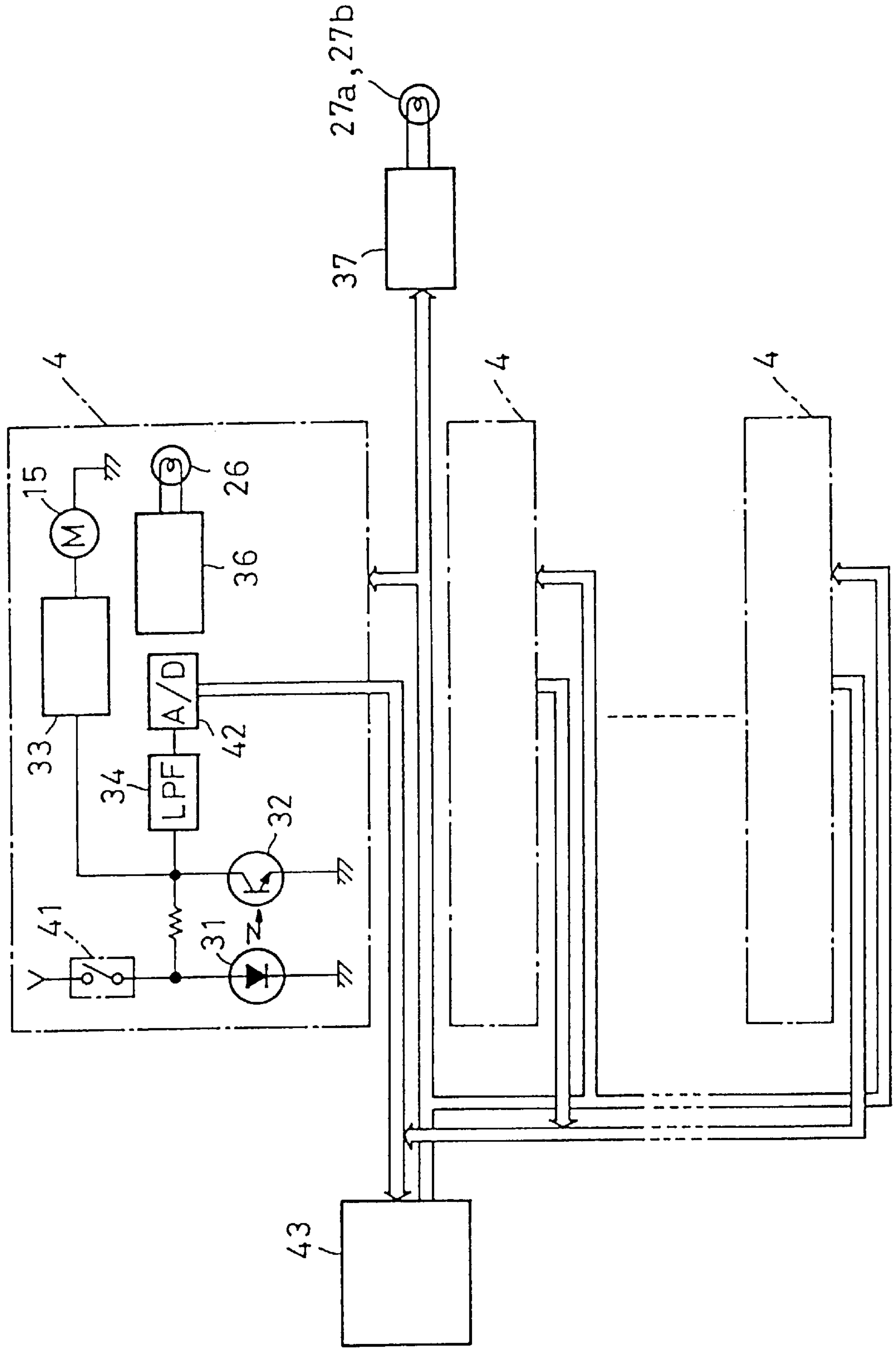
FIG. 4 is a schematic view of another circuit of each feeder.
Figure 5:
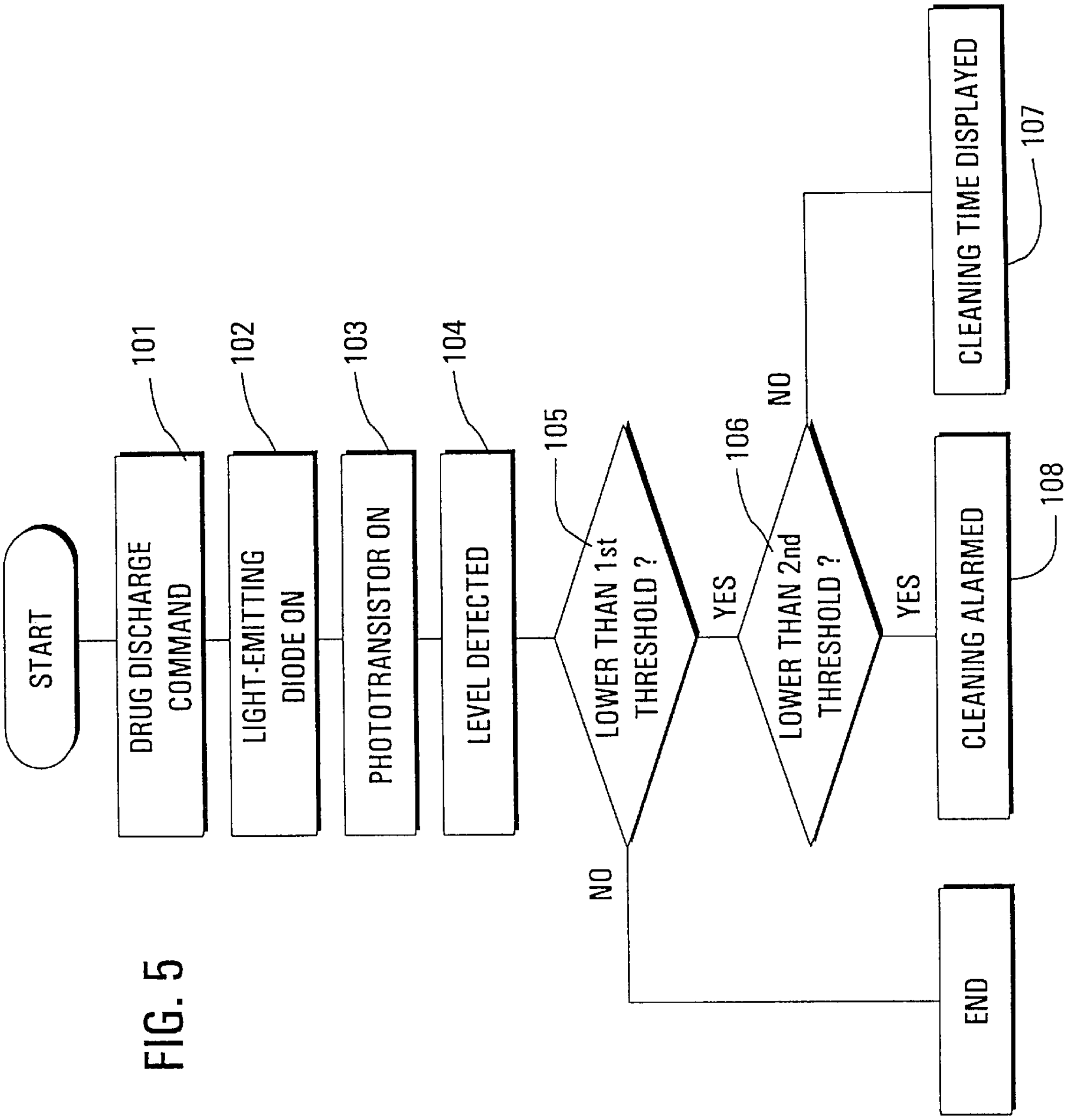
FIG. 5 is a flowchart showing steps carried out in the apparatus of FIG. 1.

FIG. 4 schematically shows another type of circuit for each feeder 4. It has an on-off switch 41 series-connected to the phototransistor 32. Low-frequency components of the output of the phototransistor 32 is applied to an A/D converter 42, which converts the low-frequency components to digital signals. A microprocessor 43 as a comprehensive control means of the entire apparatus executes the steps shown in the flowchart of FIG. 5 to determine whether or not each feeder 4 has been soiled to a predetermined degree.

Specifically, when commands are inputted to discharge a predetermined number of drugs from a given feeder 4 (Step 101), the microprocessor 43 turns on the light emitting diode 31 of this feeder 4 and activates the necessary parts of the feeder 4 to discharge drugs by the predetermined number.

Specifically, the microprocessor 43 closes the on-off switch 41 of the above particular feeder 4 to turn on the light emitting diode 31 (Step 102), and activates the motor control circuit 33 to discharge drugs by the predetermined number by intermittently rotating the intermittent motor 15. The light emitted from the light emitting diode 31 is intercepted by the phototransistor 32, and the low-frequency components of the output of the phototransistor 32 are inputted in the A/D converter 42, which converts the analogue low-frequency components to digital signals. The digital signals, which represent the level of the low-frequency components, are inputted in the microprocessor 43.

The microprocessor 43 then compares the level of the digital signals inputted with a first and a second threshold (Steps 105 and 106). If the level of the digital signals is lower than the first threshold (YES in Step 105) and higher than the second threshold (NO in Step 106), the microprocessor 43 determines that the feeder 4 has been soiled to a certain degree, displays a message on CRT (not shown) to the effect that the particular feeder needs cleaning in a few days' time (Step 107), and stores the ID number of this particular feeder in the memory. If, on the other hand, the above level is lower than both the first and second thresholds (YES in both Steps 105 and 106), the microprocessor 43 determines that the feeder has been considerably soiled, and turns on the second warning lamp 26 of the particular feeder 4 and the first warning lamp 27*a* (or 27*b*) of the cabinet 1 to which the particular feeder 4 belongs (Step 108).

Figure 6:
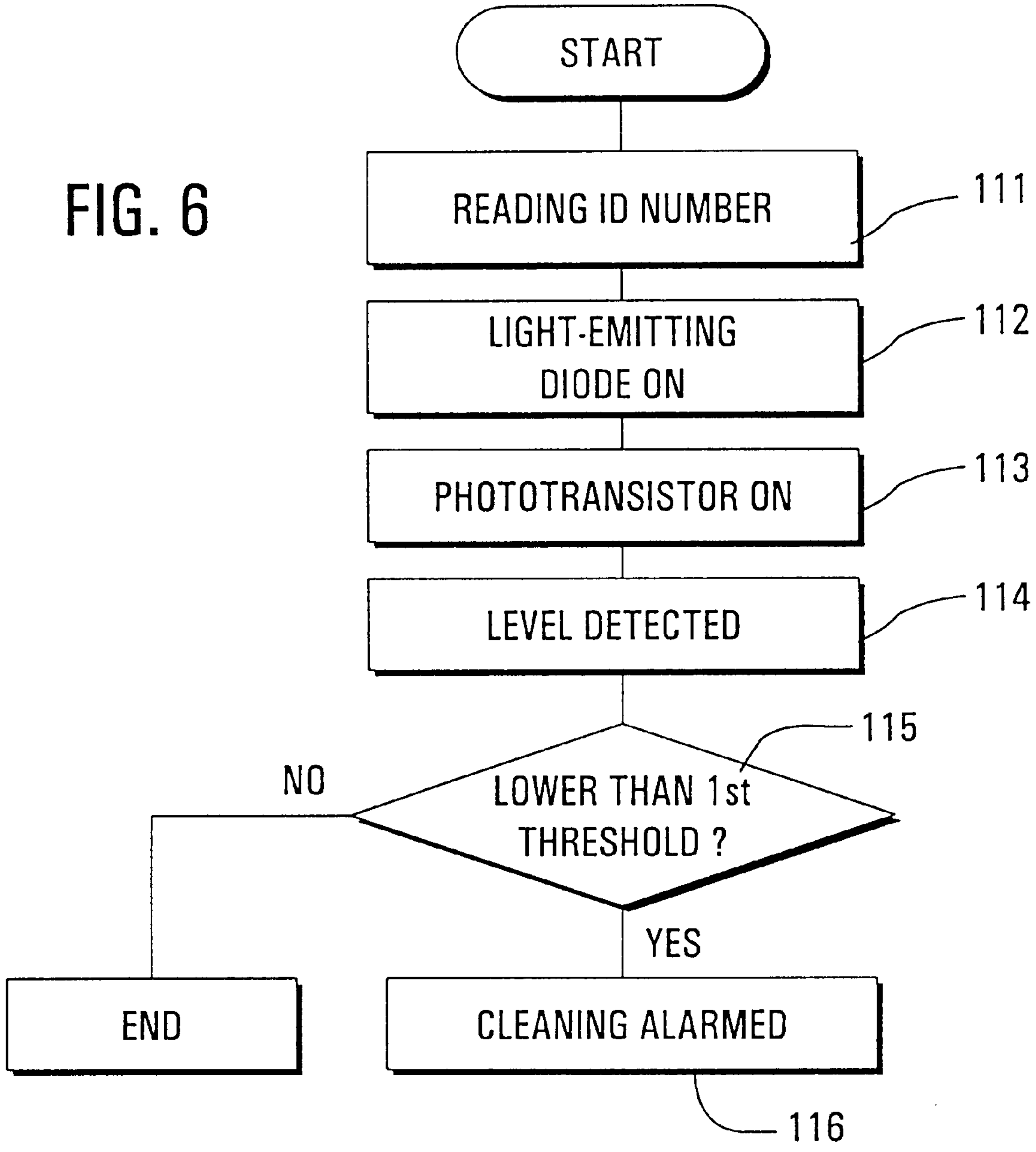
FIG. 6 is a flowchart showing different steps carried out in the apparatus of FIG. 1.

If the microprocessor 43 determines that cleaning is needed in a few days' time in Step 107, the steps of the flowchart shown in FIG. 6 is carried out after waiting for a predetermined time period.

More particularly, the microprocessor 43 reads the ID number of the feeder 4 that has led to the execution of Step 107, and turns on the light emitting diode 31 of this feeder 4 by closing the on-off switch 41 (Step 112).

The light from the light emitting diode 31 is intercepted by the phototransistor 32 (Step 112). Low-frequency components of the light intercepted are inputted in the A/D converter to produce digital signals that represent the level of the low-frequency components. The digital signals are fed to the microprocessor 43 (Step 114).

The microprocessor 43 compares the level of the digital signals received with a first threshold (Step 115). If the former is lower than the latter (YES in Step 115), the microprocessor turns on the second warning lamp 26 of the particular feeder 4 and the first warning lamp 27*a* or 27*b* of the cabinet 1 to which the particular feeder belongs (Step 116).

Figure 7:
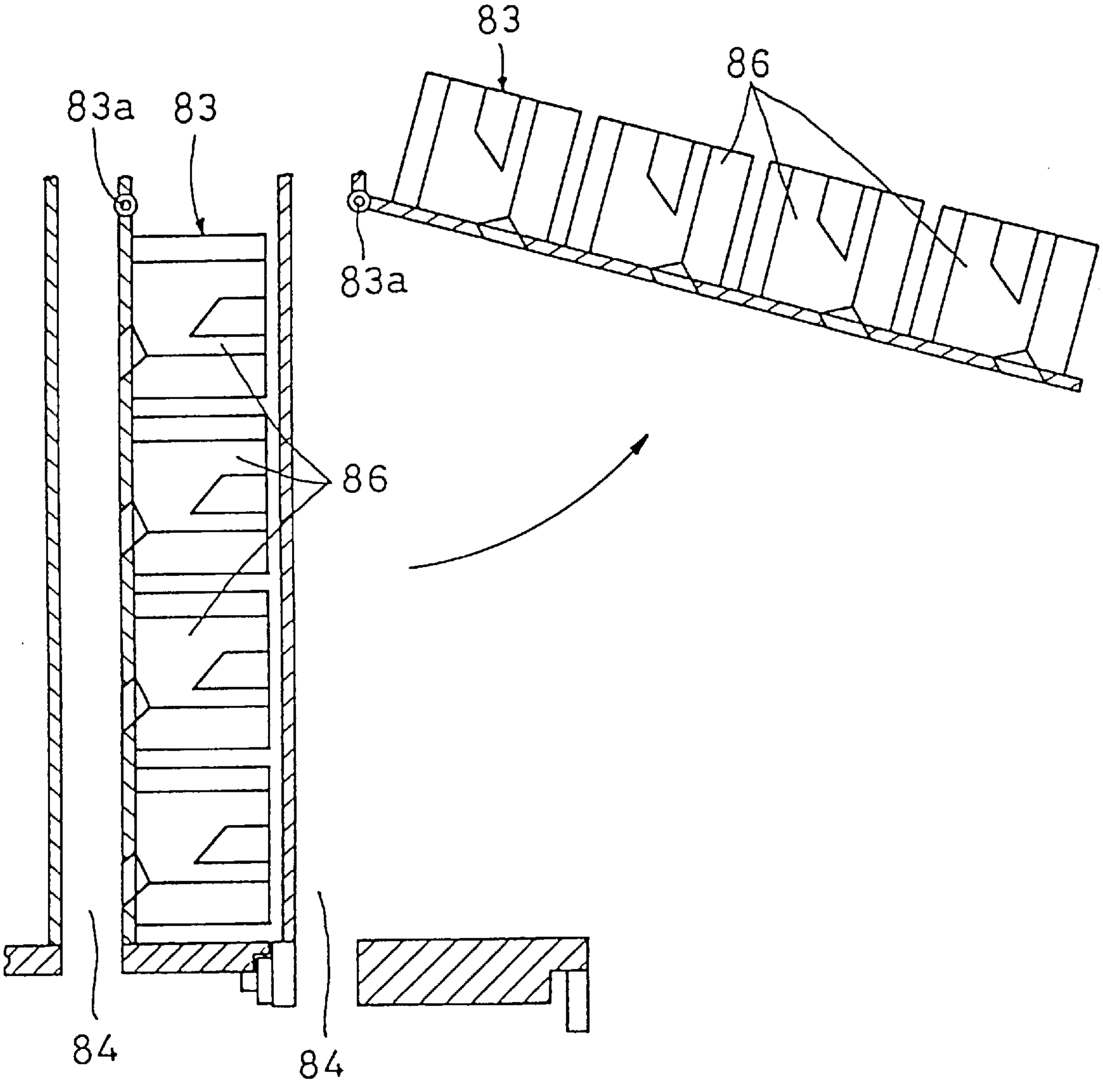
FIG. 7 is a view of another embodiment of the drug storage/discharge apparatus according to this invention.
Figure 8:
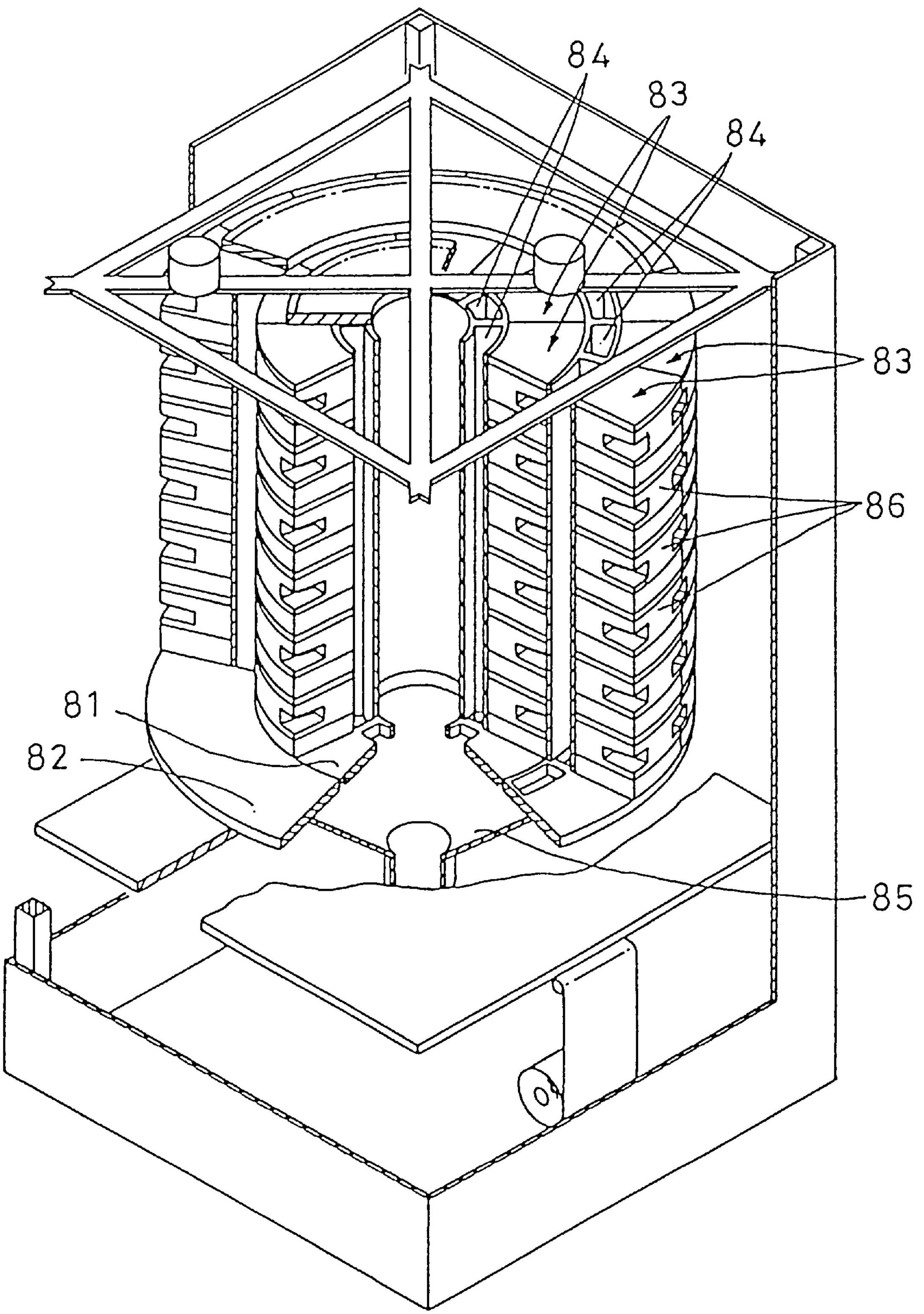
FIG. 8 (PRIOR ART)
FIG. 8 is a perspective view of a conventional apparatus.

FIG. 7 shows another embodiment of the drug storage/discharge device according to this invention. This device is used in an apparatus shown in FIG. 8. The apparatus is of the type in which a plurality of columns 83 of feeders 86 are arranged annularly. Each feeder column 83 is pivotable about its top end 83*a*. Thus, by pivoting the feeder columns outwardly about their top ends, the guide paths 84 are exposed.

This invention is not limited to the above-described particular embodiments but is susceptible to various modifications. For example, the openable side wall of each guide path may be formed not by the feeders but by a single, integral plate member. Also, instead of pivotally coupling such openable side walls, they may be detachably engaged.

As described, according to this invention, by opening one side wall of each drug guide path, it can be cleaned easily. It is also possible to visually check if the guide path has been cleaned sufficiently. Another advantage of this structure is that very high dimensional and/or assembling accuracy is not required.

What is claimed is:

1. A drug storage/discharge apparatus comprising:

a plurality of drug feeders mounted adjacent a fixed member and being arranged in a plurality of columns each of said columns having a plurality of said drug feeders; and a plurality of drug guide paths extending along said columns of said drug feeders, respectively, such that at least one wall of each of said drug guide paths is formed by said drug feeders, wherein said drug feeders in each column are coupled together to form a plurality of feeder column assemblies, and each of said feeder column assemblies has a first end that is pivotally coupled to said fixed member so as to be pivotable between an open position and a closed position independently of the other of said feeder column assemblies.

2. The drug storage/discharge apparatus as claimed in claim 1, wherein movement of each of said feeder column assemblies to the open position exposes interior surfaces of said respective drug guide path.

* * * * *